United States Patent
Hayes et al.

[15] 3,677,344
[45] July 18, 1972

[54] MOBILITY CONTROL IN FLOODING RESERVOIRS CONTAINING WATER-SENSITIVE CLAY MINERALS

[72] Inventors: John B. Hayes; Bruce L. Knight, both of Littleton, Colo.

[73] Assignee: Marathon Oil Company, Findlay, Ohio

[22] Filed: Sept. 22, 1970

[21] Appl. No.: 74,336

[52] U.S. Cl............................166/252, 166/273
[51] Int. Cl..................................E21b 43/22
[58] Field of Search....................166/252, 273-275

[56] References Cited

UNITED STATES PATENTS

| | | |
|---|---|---|
| 3,275,075 | 9/1966 | Gogarty et al.............166/275 UX |
| 3,123,135 | 3/1964 | Bernard et al.............166/275 X |
| 3,482,631 | 12/1969 | Jones......................166/273 |
| 3,467,187 | 9/1969 | Gogarty et al.............166/275 X |
| 3,208,528 | 9/1965 | Elliott et al..............166/273 X |
| 3,477,508 | 11/1969 | Hurd......................166/275 X |
| 3,482,632 | 12/1969 | Holm......................166/275 X |
| 3,500,924 | 3/1970 | Poettmann................166/273 X |
| 3,506,070 | 4/1970 | Jones......................166/273 |

*Primary Examiner*—Stephen J. Novosad
*Attorney*—Joseph C. Herring, Richard C. Willson, Jr. and Jack L. Hummel

[57] ABSTRACT

Improved mobility control in flooding an oil-bearing subterranean formation containing water-sensitive clay minerals is obtained by injecting into the formation a micellar dispersion containing a lower concentration of electrolytes than is present in the interstitial water of the formation, the effect being to impart a reduced permeability to the flow of the micellar dispersion through the formation and thus obtain better mobility control of the process. A mobility buffer can optionally be injected behind the micellar dispersion, the buffer containing a lesser concentration of electrolyte than the electrolyte within the interstitial water; the result being to obtain reduced permeabilities to the flow of the buffer and thus better mobility control.

13 Claims, 1 Drawing Figure

LIQUID PERMEABILITY/KLINKENBERG PERMEABILITY AS A FUNCTION OF SALINITY

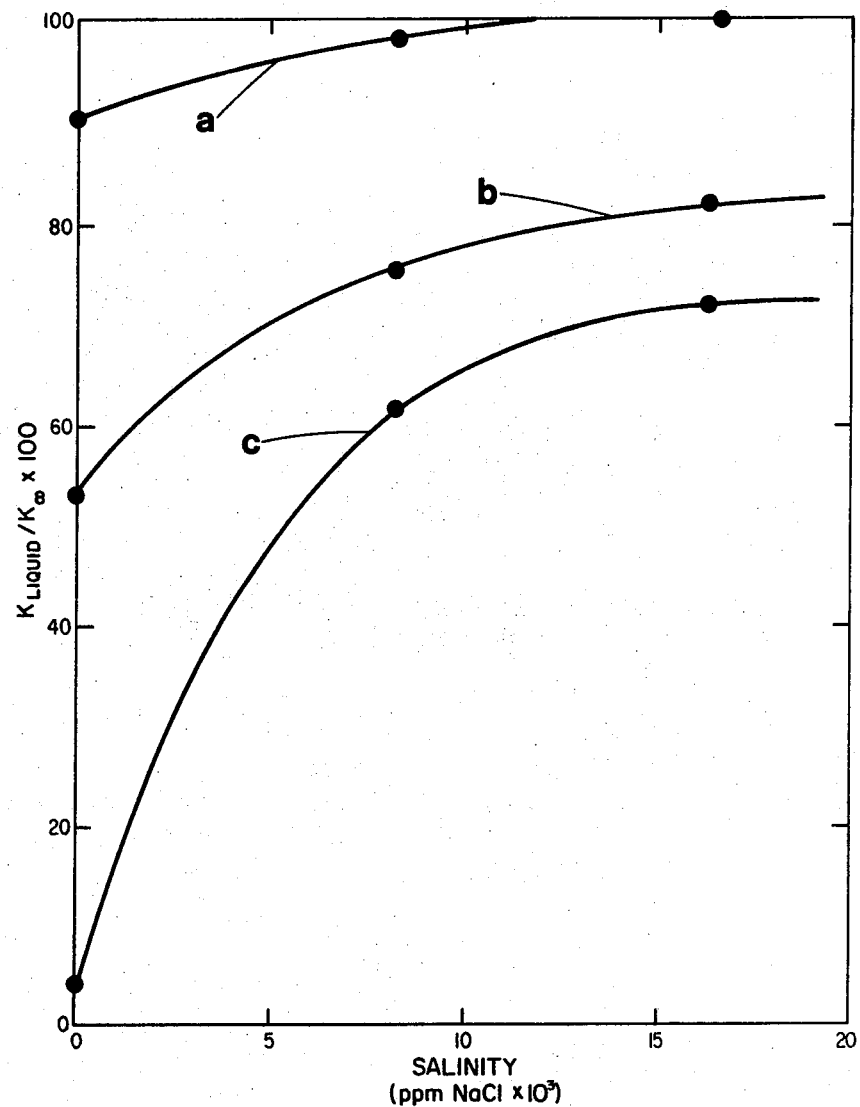
LIQUID PERMEABILITY/KLINKENBERG PERMEABILITY AS A FUNCTION OF SALINITY
*INVENTOR*
JOHN B. HAYES
BRUCE L. KNIGHT
BY
*ATTORNEY*

1

MOBILITY CONTROL IN FLOODING RESERVOIRS CONTAINING WATER-SENSITIVE CLAY MINERALS

BACKGROUND OF THE INVENTION

1. Field of the Invention

This invention relates to a secondary or tertiary recovery process wherein a displacing fluid, e.g. micellar dispersion, is injected into a reservoir containing water-sensitive clays, and displaced through the reservoir toward a production well to recover crude oil through the production well. The displacing fluid can be followed by an aqueous mobility buffer containing salts and this, in turn, followed by a water drive. The water-sensitive characteristic of the reservoir clays is used to obtain better mobility control.

2. Description of the Prior Art

The term "water-sensitive clays" is defined to include those clay mineral particles in the reservoirs which effect a reduction in permeability caused by the swelling of indigenous clay minerals and/or by the dispersion and/or movement of indigenous particles to "block" the pores. The phenomenon of recognizing water-sensitive clay minerals is defined in "Analytical Techniques for Recognizing Water-Sensitive Rocks", Journal of Petroleum Technology, August, 1963, pp. 813-818, authored by Dr. Charles H. Hewitt.

It is known that certain reservoirs are sensitive to water infiltration wherein the water is of different character (e.g. different electrolyte or salt content) than the interstitial water or connate water. Plugging or reduction in permeability can occur in such reservoirs. Such adversely affects recovery methods and in some cases is cause for complete failure of the process. The damage is thought to occur from one of the following:

1. swelling of the indigenous clay minerals, which can result in constricting the pores;
2. dispersion of the indigenous clay minerals, can be non-swelling particles, and/or rearrangement of the indigenous particles through the flow of fluids in the process, resulting in plugging of the pores; and,
3. a combination of swelling and dispersion of the indigenous particles.

Commonly known water-sensitive clay minerals are the montmorillonites, mixed-layered clays and certain types of illite and like materials. As a general rule, the salinity of the surrounding fluids directly influences the swelling of the clays, and more specifically, a decrease in the salinity generally increases the amount of swelling of the clays.

Examples of reservoirs containing water-sensitive clays include:

1. the Muddy sandstone in Wyoming, U.S.A.; this has slight sensitivity;
2. the Stevens sandstone in California, U.S.A.; it has moderately sensitive swelling clays;
3. the Bow Island sandstone in Alberta, Canada, which has strongly sensitive swelling clays; and
4. the Nugget sandstone in Wyoming, U.S.A., which has a strong sensitivity because of particle plugging.

In a secondary or tertiary recovery method, mobility control of the process is very important if an efficient flood is to be obtained. That is, mobility control must be maintained to protect against fingering of the drive fluid through the displacement fluid and then to the production well, bypassing the crude oil.

Applicants have discovered a novel method whereby the water-sensitivity characteristic of clay minerals is used to enhance mobility control of a recovery process. The general design criteria of an efficient recovery process are taught in U.S. Pat. Nos. 3,443,635 and 3,467,187 to Gogarty et al. and 3,443,636 and 3,406,754 to Gogarty. Where multiple slugs are injected, the general theory is to design the mobility of the first displacing slug to at least approach the mobility of the combination of hydrocarbon and interstitial water within the formation, then design the mobility of the second slug, referred to in some cases as the mobility buffer slug, to have a mobility about equal to that of the rear end of the first displacing slug and optionally to increase the mobility of the back portion of the mobility buffer to a value about equal to that of the drive fluid. If the drive fluid is water, then the back portion of the mobility buffer can have a mobility about equal to that of the water flowing in the reservoir.

SUMMARY OF THE INVENTION

Applicants have discovered that by utilizing the water-sensitivity of the clay minerals, the electrolyte content of the injected slug(s) in a secondary or tertiary recovery method can be designed to obtain the desired mobility of the particular slug(s). For example, the electrolyte content of a micellar dispersion can be designed to obtain a desired mobility in a reservoir containing water-sensitive clay minerals; that is, a reduced mobility can be obtained by incorporating less electrolyte in the dispersion than in the water in which the dispersion is displacing, the water being displaced by the dispersion is in equilibrium with the water-sensitive clay. Thereafter, the micellar dispersion can be followed by an aqueous mobility buffer which contains a mobility reducing agent and sufficient amounts of electrolyte to obtain the desired mobility in the reservoir containing the water-sensitive clays. Thereafter, a drive water can be injected which also can contain a desired electrolyte content to obtain the desired mobility for an efficient overall flooding process. That is, by using the water-sensitive characteristic of the clay minerals, the injected slugs can have desired electrolyte contents to obtain desired mobility control.

BRIEF DESCRIPTION OF THE DRAWING

The FIGURE represents the variation of liquid permeability/Klinkenberg permeability of certain sandstones as a function of salinity (NaCl in water). Curve a represents a sandstone having slight sensitivity, this sandstone being the Muddy sandstone in Wyoming, U.S.A. Curve b represents the Stevens sandstone in California, U.S.A., which has a moderate sensitivity from the swelling of the clays, and Curve c represents Bow Island sandstone in Alberta, Canada, which has a strong sensitivity from swelling clays.

DESCRIPTION OF THE PREFERRED EMBODIMENTS

Use of micellar dispersions, also identified as micellar solutions and microemulsions, is known to increase oil recoveries in secondary and tertiary recovery methods—see U.S. Pat. Nos. 3,254,714 to Gogarty et al.; 3,497,006 to Jones et al.; 3,506,070, and 3,506,071 to Jones. The micellar dispersion can be oil-external or water-external. Examples of volume amounts include 2 to about 70 percent or more hydrocarbon, 10 to about 95 percent water, at least about 4 percent surfactant, and optionally about 0.01 to about 20 percent cosurfactant (also identified as semi-polar organic compound and cosolubilizer) and/or 0.001 to about 5 percent or more by weight of electrolyte (based on the aqueous medium within the micellar dispersion). The prior art, e.g. the above patents, teaches numerous hydrocarbons, surfactants, cosurfactants, and electrolytes that are useful within the micellar dispersion.

Before designing the desired electrolyte content for the slugs within the flooding process, the reservoir is analyzed first for water-sensitive clay minerals, for example, data can be obtained to support a relationship as taught in the Figure. Once data are obtained for the particular reservoir that is representative of the area of the reservoir to be flooded, then the micellar dispersion, optional mobility buffer, and subsequent drive fluid can be designed to obtain the desired mobility control, by a reduction in relative permeabilities, during the flooding process.

Preferably, the micellar dispersion is followed by an aqueous mobility buffer fluid. The purpose of the mobility buffer is to protect against fingering of a subsequent drive fluid into the micellar dispersion. Specific examples of mobility reducing agents include, e.g. partially hydrolyzed, high molecular weight polyacrylamide; biopolymers such as linear polysaccharides; high molecular weight sulfonated polyacrylamides; and like materials which are natural or synthetic polymers and have high molecular weights (e.g. 500,000 – 10,000,000). If a high electrolyte or salt content is desired in the mobility buffer for mobility control, possibly an increased amount of mobility reducing agent needs to be incorporated within the mobility buffer when "salt sensitive" mobility reducing agents are used. The concentration of mobility reducing agents and the desired electrolyte content to obtain desired mobilities can be determined by routine laboratory work using methods disclosed within the art.

For optimum oil recovery in a secondary or tertiary recovery method, the micellar dispersion desirably has a mobility about equal to or less than about that of the combination of the formation fluids (hydrocarbon plus interstitial water) within the reservoir. The mobility of the micellar dispersion can be graded from a low value at the front portion to a relatively higher value at the back portion of the micellar dispersion.

Thereafter, a mobility buffer is preferably injected behind the micellar dispersion. The front portion of the mobility buffer desirably has a mobility about equal to or less than about that of the back portion of the micellar dispersion. Thereafter, the portions of the mobility buffer can have increasing mobilities to a high mobility at the rear end of the mobility buffer which can approach that of a subsequent drive fluid. Desirably, the drive fluid is water; however, the mobility buffer and the drive fluid can be foam, a combination of foam and water, etc.

The following example is presented to teach specific embodiments of the invention. Unless otherwise specified, all percents are based on volume.

A reservoir similar to Curve C of the figure is flooded. The reservoir has the following liquid permeabilities at the indicated salinity levels:

| Liquid Permeability (md) | Salinity (ppm NaCl) |
|---|---|
| 4 | 0 |
| 12 | 500 |
| 50 | 5000 |
| 72 | 20000 |

The reservoir is at residual oil saturation containing interstitial water having a salinity of 20,000 ppm NaCl. The value of the liquid permeability is 72 md. A water-external micellar dispersion containing about 17.5 percent crude oil, about 12 percent of an ammonium petroleum sulfonate (activity equals about 66 percent, average equivalent weight about 410–420), about 70 percent water containing 5,000 ppm. of NaCl, and about 0.5 percent of p-amyl alcohol is injected into the formation in volume amounts of about 5 percent formation pore volume. The micellar dispersion containing 5,000 ppm NaCl reduces the liquid permeability in the reservoir to 50 md, a decrease of about 30 percent from the 72 md level. Thereafter, there is injected 60 percent formation pore volume of an aqueous mobility buffer containing 500 ppm of NaCl and 600 ppm of Kelzan-M (a linear polysaccharide marketed by Xanco, a division of Kelco Co., Houston, Tex., U.S.A.) in the first half and 200 ppm Kelzan-M in the last half. The effective permeability to the mobility buffer of the reservoir is about 12 md. Thereafter a drive water containing about 500 ppm of NaCl is injected into the reservoir in sufficient amounts to displace the mobility buffer and micellar dispersion through the reservoir toward a production means. Crude oil is recovered through the production means by this improved mobility control means.

It is not intended that this application be limited to the specifics taught herein. Rather, all equivalents obvious to those skilled in the art are intended to be incorporated within the scope of the invention as defined within the specification and appended claims.

What is claimed is:

1. An improved method of flooding an oil-bearing subterranean formation containing water-sensitive clay minerals and interstitial water containing a predetermined electrolyte content wherein a micellar dispersion is injected into the formation and displaced toward a production means in fluid communication with the formation, the process comprising:
    1. designing the micellar dispersion to contain an amount of electrolyte lower than the electrolyte content within the interstitial water of the formation, the interstitial water being in equilibrium with the water-sensitive clay minerals, the lower amount being sufficient to impart a reduced permeability to the flow of the micellar dispersion within the formation to obtain better mobility control of the process, and
    2. displacing the micellar dispersion toward the production means and recovering crude oil therethrough.

2. The process of claim 1 wherein the micellar dispersion contains surfactant, hydrocarbon, and aqueous medium.

3. The process of claim 1 wherein the micellar dispersion is water-external.

4. The process of claim 1 wherein an aqueous mobility buffer is injected behind the micellar dispersion.

5. The process of claim 4 wherein the electrolyte content of the mobility buffer is lower than the electrolyte content of the interstitial water and is sufficiently lower to obtain a reduced permeability to the flow of the mobility buffer within the formation to obtain better mobility control of the process.

6. The process of claim 1 wherein a drive water is injected into the formation to displace the micellar dispersion toward the production well.

7. The process of claim 6 wherein the electrolyte content of the drive water is lower than the electrolyte content of the interstitial water and is sufficiently lower to obtain a reduced permeability to the flow of drive water flowing through the formation to obtain better mobility control.

8. An improved process of flooding an oil-bearing subterranean formation containing water-sensitive clay minerals and interstitial water containing a predetermined electrolyte content and having an injection means in fluid communication with a production means and wherein a micellar dispersion is injected into the formation and displaced toward the production means to recover crude oil therethrough, the process comprising:
    1. analyzing the reservoir rock within the formation and the interstitial water in equilibrium with the reservoir rock for the relationship of permeability of water flowing through the reservoir rock at different salinities,
    2. designing a water-external micellar dispersion to contain an amount of electrolyte lower than the electrolyte content within the interstitial water in equilibrium with the reservoir rock, the lower amount being sufficient to impart a reduced and predetermined permeability to the flow of the micellar dispersion within the reservoir rock, and
    3. displacing the micellar dispersion toward the production means to recover crude oil therethrough.

9. The process of claim 8 wherein the micellar dispersion contains about 2 to about 70 percent hydrocarbon, up to 95 percent water, and at least about 4 percent of a petroleum sulfonate.

10. The process of claim 8 wherein a aqueous mobility buffer is injected behind the micellar dispersion.

11. The process of claim 10 wherein the electrolyte content of the mobility buffer is lower than the electrolyte content of the interstitial water in equilibrium with the reservoir rock, and is sufficiently lower to obtain a reduced and predetermined permeability to the flow of the mobility buffer within the reservoir rock.

12. The process of claim 11 wherein a drive water is injected behind the mobility buffer to displace the mobility buffer and micellar dispersion toward the production well.

13. The process of claim 11 wherein the mobility buffer contains a mobility reducing agent which is a biopolymer.

* * * * *